（12）United States Patent
Hubert

(10) Patent No.: US 7,571,492 B2
(45) Date of Patent: Aug. 4, 2009

(54) CURRENT SOURCE FOR CRYPTOGRAPHIC PROCESSOR

(75) Inventor: Gerardus T. M. Hubert, Geldrop (NL)

(73) Assignee: NXP B.V., Eindhoven (NL)

( * ) Notice: Subject to any disclaimer, the term of this patent is extended or adjusted under 35 U.S.C. 154(b) by 740 days.

(21) Appl. No.: 10/527,560

(22) PCT Filed: Aug. 29, 2003

(86) PCT No.: PCT/IB03/03963

§ 371 (c)(1),
(2), (4) Date: Mar. 11, 2005

(87) PCT Pub. No.: WO2004/025444

PCT Pub. Date: Mar. 25, 2004

(65) Prior Publication Data

US 2005/0240782 A1    Oct. 27, 2005

(30) Foreign Application Priority Data

Sep. 13, 2002   (GB)   ................... 0221240.5

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)

(52) U.S. Cl. ............................................. 726/36; 380/1
(58) Field of Classification Search ................... 726/36; 380/1

See application file for complete search history.

(56) References Cited

U.S. PATENT DOCUMENTS 6,848,619 B1 * 2/2005 Leydier ...................... 235/492
7,146,509 B2 * 12/2006 Marinet et al. ............... 713/194

FOREIGN PATENT DOCUMENTS

| EP | 1 113 386 | 7/2001 |
| WO | WO 99/49416 | 9/1999 |
| WO | WO 01/08088 | 2/2001 |

* cited by examiner

*Primary Examiner*—Kambiz Zand
*Assistant Examiner*—Stephen Sanders

(57) ABSTRACT

To provide increased security against differential power analysis attacks, a data processing device is provided with a current converter that draws current from an external supply and cyclically apportions drawn current between a charge storage device and a processor such that the drawn current varies independently of the instantaneous power demand of the processor. The data processing device includes: a processor; a charge storage device coupled to the processor; and a current source for supplying the processor with operating current, and adapted to vary its output current independently of the instantaneous power demand of the processor.

32 Claims, 2 Drawing Sheets

CURRENT SOURCE FOR CRYPTOGRAPHIC PROCESSOR

The present invention relates to cryptographic devices such as those typically installed in smart cards and other devices, which may have vulnerability to power analysis attacks to obtain information therefrom.

Many cryptographic devices are implemented using microprocessors and associated logic on devices such as smart cards. It is often necessary to ensure that important data stored on smart cards, such as cryptographic keys and the like, is kept secure. A number of power analysis techniques have been published that facilitate the obtaining of data from the smart card that would otherwise, in the course of normal input and output operations, be securely encrypted. In particular, analysis of the power consumption of the logic performing an encryption or decryption operation may be used to establish the round keys used in the encryption or decryption operation.

Such techniques are discussed, for example, in Kocher et al: "Differential Power Analysis", www.cryptography.com and Messerges et al: "Investigations of Power analysis Attacks on Smartcards", Proceedings of USENIX Workshop on Smartcard Technology, May 1999, pp. 151-161. The power consumption of a smart card is conventionally strongly related to the number of bit transitions occurring at each clock pulse. Statistical analysis of the power dissipation of the smart card during successive cycles of a cryptographic algorithm has been shown to yield sufficient information to obtain the cryptographic keys in use.

Differential power analysis attacks rely on correlation between the power dissipation traces and the data processing operations of the processor logic and the ability to average many such traces over time.

It is an object of the present invention to provide a power supply and mode of operation of a cryptographic processor that improves the security of cryptographic processors against power analysis attacks.

According to one aspect, the present invention provides a data processing device including:
 a processor,
 a charge storage device coupled to the processor,
 a current source for supplying the processor with operating current, and adapted to vary its output current independently of the instantaneous power demand of the processor.

According to another aspect, the present invention provides a method of operating a data processing device, comprising the steps of:
 drawing current from an external supply; and
 cyclically apportioning drawn current between a charge storage device and a processor within the data processing device such that the drawn current varies independently of the instantaneous power demand of the processor.

Embodiments of the present invention will now be described by way of example and with reference to the accompanying drawings in which.

Figure 1:
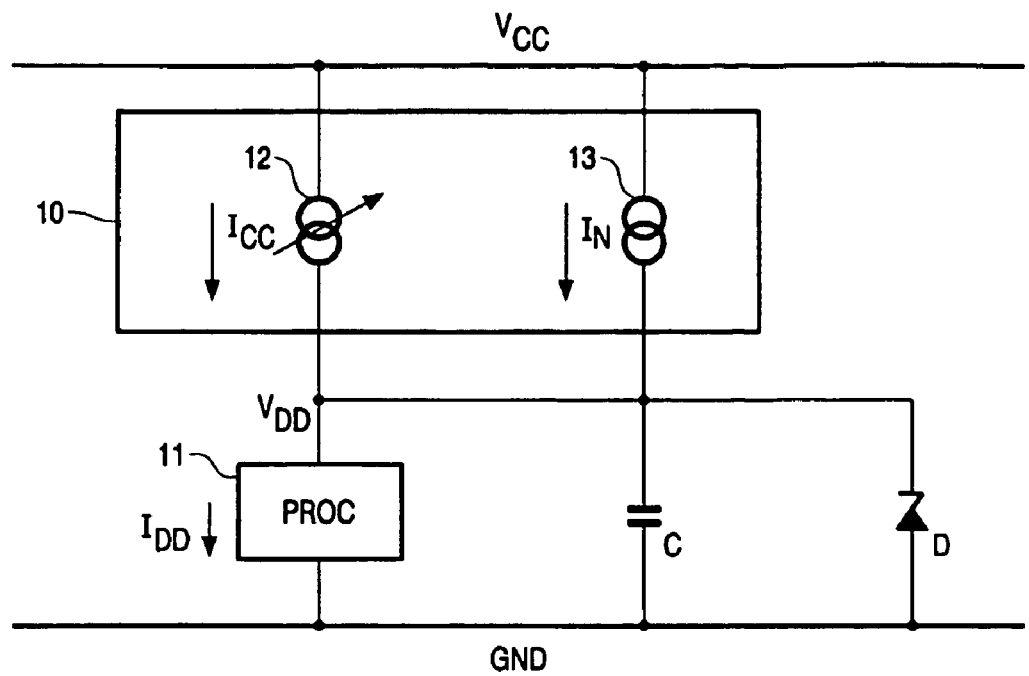
FIG. 1 illustrates a power supply for a processor according to a preferred embodiment of the invention.

With reference to FIG. 1, various possible embodiments of a DC-DC converting power supply for a cryptographic processor are now described.

A current source 10 draws current from a supply voltage $V_{CC}$ and supplies a current $I_{DD}$ to a processor 11. The processor 11 may be any form of data processing logic circuitry. A decoupling capacitor C receives current from the current source 10 when the current supplied by the current source 10 exceeds the requirements of the processor 11, and supplies current to the processor when the current supplied by the current source falls short of the requirements of the processor. The function of capacitor C could also be implemented by any suitable alternative charge storage mechanism.

In a first embodiment, the current source 10 comprises a first current source 12 which supplies substantially constant current $I_{CC}$ at two different current levels. A first one of these current levels is higher than an average demand of the processor and the second one of these current levels is lower than an average demand of the processor 11. Switching between the current levels occurs on a periodic or aperiodic basis as will be illustrated later.

During periods in which the first one of the current levels is being delivered, the voltage $V_{DD}$ supplied to the processor will rise, as excess current is stored in the capacitor C. During periods in which the second one of the current levels is being delivered, the voltage $V_{DD}$ will fall, as the shortfall in current is supplied (discharged) from capacitor C.

The result is a saw tooth voltage $V_{DD}$. Over a period of time, the average current $I_{CC}$ supplied by the current source 10 will be equal to the average current demand $I_{DD}$ of the processor. However, it will be noted that the instantaneous values of current $I_{CC}$ supplied by the current source 12 very rarely match the instantaneous values of current demand $I_{DD}$ of the processor 11.

The switching of the current levels of the current source 12 is determined independently of the instantaneous activities of the processor, so that the frequency and phase of the saw tooth voltage $V_{DD}$ do not reflect the immediate activities of the processor. In other words, frequency and phase of the voltage $V_{DD}$ are not linked to an internal clock frequency of the processor, nor to data manipulation operations being carried out by the processor 11.

The control of the current source 12 typically will also include some hysteresis, which is advantageous in maintaining a lack of correlation between the processor activity and the frequency and phase of the saw tooth voltage $V_{DD}$.

The processor 11 is controlled by an internal oscillator clock of which the frequency is voltage dependent. Typically, the lower the voltage supply $V_{DD}$ to the processor, the lower the clock frequency of the processor. Conversely, the higher the voltage supply $V_{DD}$ to the processor, the higher the clock frequency of the processor. This means that the duration of any procedure performed by the processor (for example, a RSA calculation or a DES/AES encryption/decryption operation) will depend upon the level of the supply voltage $V_{DD}$.

In a differential power analysis attack, it is necessary to align many successive power traces so that corresponding processing operations are aligned in the time axis and can be averaged. This becomes very much more difficult when the frequency of operation of the processor is continually varying, because the effective time base of successive power traces is continually changing.

The processor might also be asynchronously designed, which will also result in the duration of any procedure performed by the processor being dependent upon the level of supply voltage $V_{DD}$.

In a further embodiment, the current source 10 may include, in addition to bi-level current source 12, a second current source 13 which is adapted to deliver a pseudo-noise current component $I_N$ to the current supply. The noise current $I_N$ varies on a random or pseudo-random basis. The second current source 13 may be operated in a number of different ways.

When $I_N$ is controlled by a pseudo-noise generator it will hide the trigger points that are necessary in a differential power analysis attack in order to provide a reference point on the time axis, to align multiple traces for averaging. The pseudo-noise generator therefore makes triggering of suitable analysis equipment (eg. a digital sampling oscilloscope) even more difficult.

If the clock of the pseudo-noise generator 13 has a fixed frequency, then analysis of power traces by adding a number of power traces will filter out the noise. However, the bigger the amplitude of the noise current $I_N$, the more traces are needed to remove the noise and the greater the blurring of target patterns and spikes in the power traces. Therefore, the noise current $I_N$ is preferably a significant proportion of the bi-level current $I_{CC}$.

Preferably, the peak value of the pseudo-noise current $I_N$ is smaller than the bi-level current $I_{CC}$ supplied by the first current source 12. In a preferred arrangement, the peak noise current $I_N$ lies approximately in the range 5 to 10% of the bi-level current $I_{CC}$ supplied by the first current source 12.

In a preferred arrangement, the pseudo-noise generator 13 is initialised for each instruction sequence of the processor 11. If the pseudo-noise generator is initialised for each instruction sequence of the processor, then the noise pattern will be the same in each power trace for that instruction sequence. Thus, when adding the power traces to try to remove noise, the noise pattern will be enhanced rather than averaged out. In this case, the differential power analyst must first determine the noise pattern and subtract it from each power trace before adding the power traces together. Every mismatch between the true noise pattern and the deduced pattern that is subtracted will then add together resulting in spurious spikes in the averaged trace. These spikes may successfully hide the true data spikes that the analyst is seeking.

In a further arrangement, the pseudo-noise generator 13 is clocked by the same clock as the processor 11, and the noise generator is initialised for each instruction sequence of the processor. In this way, the noise is substantially repeated. Adding a number of power traces together will result in a substantially constant noise signal. Some parts of the noise traces will add together and other parts will be cancelled out. Adding more traces or subtracting traces will not be effective at removing the noise component.

Figure 2:
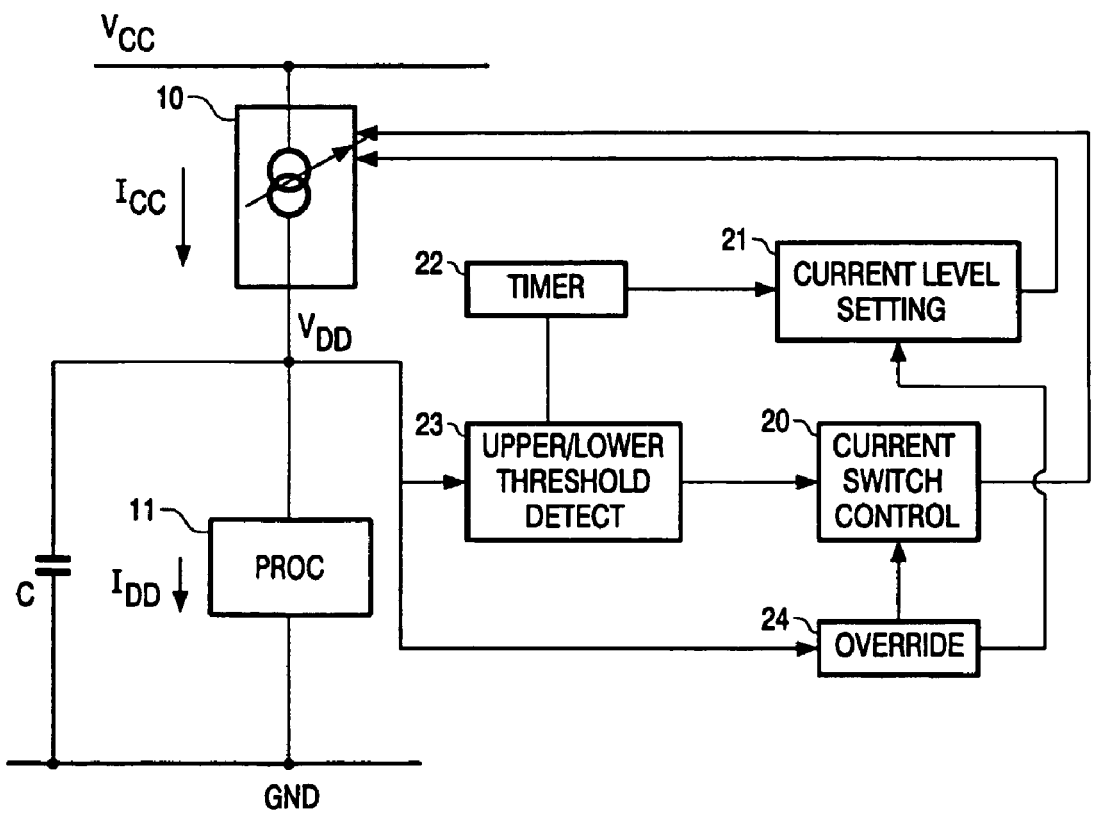
FIG. 2 shows a schematic diagram illustrating the various functional blocks of the power supply of FIG. 1.

With reference to FIG. 2, the regulation of the current source $I_{CC}$ will now be described.

In the preferred arrangement, the regulation of the current source 10 is performed automatically such that the average current $I_{CC}$ (+$I_N$ if a noise current generator 13 is included) supplied by the current generator 10 will match the average current demand of the processor 11.

The current regulator adapts the operation of the current supply when the average current demand $I_{DD}$ of the processor varies over time.

The supply voltage $V_{DD}$ is permitted to vary between an upper voltage level and a lower voltage level which are within the operating specification of the processor, such that the processor can be guaranteed to operate correctly. The current generator 10 must vary current level such that at the higher current level, the processor supply voltage $V_{DD}$ tends to rise, and such that at the lower current level the processor supply voltage $V_{DD}$ tends to fall. The upper level of $V_{DD}$ could be fixed by a zener diode D (FIG. 1) to prevent damage to the processor.

In the preferred arrangement of FIG. 2, a current switch control circuit 20 is operative to switch the current source 12 between a first, higher current level and a second, lower current level. The first current level is sufficient to cause the voltage $V_{DD}$ to rise under normal operation of the processor 11. The second current level is sufficient to cause the voltage $V_{DD}$ to fall under normal operation of the processor 11.

A threshold detection circuit 23 monitors $V_{DD}$ and detects a rise (or fall) of $V_{DD}$ to the upper (or lower) threshold levels. Upon reaching the higher threshold voltage level, the current switch control circuit 20 switches the current supply $I_{CC}$ to its second (lower) current level. Upon $V_{DD}$ reaching the lower threshold voltage level, the current switch control circuit 20 switches the current supply 10 back to its first (higher) current level.

Figure 3:
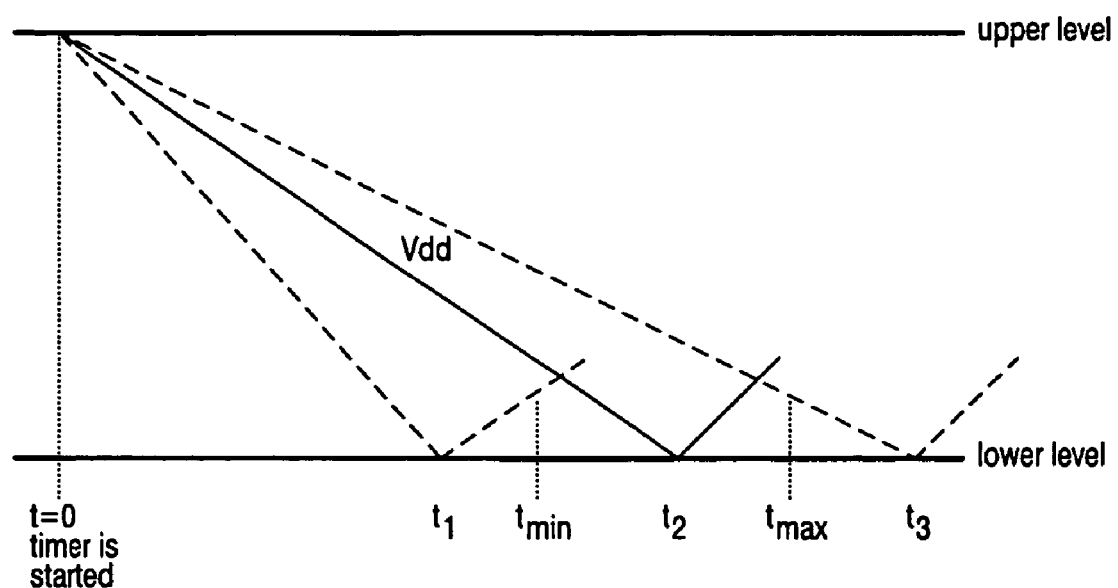
FIG. 3 is a graph illustrating the current switching control of a preferred power supply.

In a preferred arrangement, a timer circuit 22 is provided which is started when the upper threshold voltage is detected. The timer circuit 22 then determines the time period t for the processor supply voltage $V_{DD}$ to reach the lower threshold voltage. The operation of this timer circuit 22 is illustrated graphically in FIG. 3.

The timer circuit 22 determines whether the time period t falls within a permissible window $t_{max}$ to $t_{min}$. If the time period lies between $t_{max}$ and $t_{min}$ (example $t_2$), no action is taken. If the time period is less than $t_{min}$ (example $t_1$), this is communicated to a current level setting circuit 21 which operates to increase the second (lower) current level. If the time period is greater than $t_{max}$ (example $t_3$), this is communicated to the current level setting circuit 21 which operates to decrease the second (lower) current level. Preferably, the adjustments to the current levels are made incrementally. The system will always move towards an operation condition in which the downward path of the saw tooth wave pattern of $V_{DD}$ has a period between $t_{max}$ and $t_{min}$.

A similar control arrangement may be applied, mutatis mutandis, to the first (upper) current level using the timing of the upward path of the saw tooth wave.

In this way, the periodicity of the voltage level $V_{DD}$ may be maintained within predetermined bounds and the current source is controlled so as to vary the voltage output $V_{DD}$ to the processor independently of the instantaneous power demand of the processor.

If the current demand of the processor increases significantly, it is possible that the first (upper) level current is insufficient to increase $V_{DD}$. If this occurs, an override circuit 24 may come into operation to override the normal operation of the current level setting circuit 21 and/or current switch control circuit 20.

For example, override circuit 24 may detect that $V_{DD}$ remains below the lower voltage level for a predetermined time. If this occurs, the override circuit 24 may trigger the current level setting circuit 21 to set the highest possible current level. It may also be configured to prevent the current switch control circuit 20 from further switching or vary the switching period until $V_{DD}$ has recovered.

Alternatively, override circuit 24 may sense a non-rising $V_{DD}$ during a first (upper) level current phase and perform a similar action.

If the current demand of the processor decreases significantly, it is possible that the second (lower) level current is too high to decrease $V_{DD}$. If this occurs, the override circuit 24 may come into operation to override the normal operation of the current level setting circuit 21 and/or current switch control circuit 20.

For example, override circuit 24 may detect that $V_{DD}$ remains above the higher voltage level for a predetermined time. If this occurs, the override circuit 24 may trigger the current level setting circuit 21 to set the lowest possible current level. It might also prevent the current switch control circuit 20 from further switching or vary the switching period until $V_{DD}$ has recovered.

Alternatively, override circuit 24 may sense a non-falling $V_{DD}$ during a second (lower) level current phase and perform a similar action.

In an alternative embodiment, a fixed first (higher) current level may be used and only the second (lower) current level varied. In a still further embodiment, a fixed second (lower) current level may be used and only the first (upper) current level varied. The second (lower) current level may be as low as zero.

The zener diode D may be used to clamp the voltage and consume any surplus current. For low supply voltages of, for example 1.8 V, it may be difficult to obtain a good zener diode. In such a case, the zener diode D could be replaced with another voltage clamping arrangement, for example a voltage comparator and transistor.

In a general sense, it will be noted that the effect of the circuits described above is to cyclically apportion current that is drawn from an external supply rail $V_{CC}$ between a processor 11 and a charge storage circuit 10 in such a manner the current drawn from the external supply $V_{CC}$ varies independently of the instantaneous power demand of the processor. The control circuitry ensures, however, that the instantaneous and average power demands of the processor are always met.

The decoupling capacitor C filters out most of the high frequency variations in current supply $I_{CC}$. The bi-level constant current source 12 producing $I_{CC}$ also decreases any high frequency variation in the external supply current drawn from supply rail $V_{CC}$ as a result of critical data switching operations within the processor 11. The capacitor C also suppresses voltage spikes on the supply voltage that may temporarily shut off the current source, because the capacitor maintains current supply to the processor 11. This also applies to voltage spikes that are induced by an attacker to influence the processor's activity. This may include spikes that are purposefully timed by an attacker so as to prevent a critical operation of the processor being performed and thereby cause leakage of useful information.

Broader spikes or interruptions in the power supply $V_{CC}$, for which the capacitor C is unable to sustain power to the processor 11 are conventionally dealt with by appropriate processor reset circuitry (not shown).

For additional security, the internal oscillator of the processor 11 should be made immune from influence by external factors, such as varying the voltage supply $V_{CC}$. Supply voltage variations outside certain predefined limits preferably will initiate processor or system reset using control circuitry known in the art.

The repeating changes in the current source 12 output current $I_{CC}$ makes triggering in a differential power analysis attack difficult. In addition, the varying speed of the processor 11 resulting from the saw tooth supply voltage $V_{DD}$ means that power traces will not correctly align with one another, in that the time base will be varying from trace to trace.

The invention has been described with reference to an embodiment in which the current source 10 includes a bi-level constant current source 12, which results in a saw tooth supply voltage $V_{CC}$. It will be understood that the principles of the invention can also be effected using a current source 10 adapted to switch between multiple discrete levels, which would result in a supply voltage $V_{DD}$ that has a very much more complex profile.

Similarly, the current source 10 may be adapted to vary output current continuously between two predetermined levels providing that a continuously varying voltage $V_{DD}$ is achieved. The function of the cyclically varying output of the current source 12 is to ensure that the processor supply voltage $V_{DD}$ varies over time as a function of some parameter which is not linked to instantaneous power demand of the processor.

It will be understood that for security against power analysis attacks on the processor 11, it is important that the voltage node $V_{DD}$ is not accessible to an external probe. Therefore, the processor 11, capacitor C (or other charge storage device), and current source 10 are preferably integrated onto a single integrated circuit (or formed as separate devices within a single sealed device package) for which there is no indication (direct or indirect) of the voltage $V_{DD}$ provided at any of the output pins of the package.

Other embodiments are intentionally within the scope of the appended claims.

The invention claimed is:

1. A data processing device including:
   a processor;
   a charge storage device coupled to the processor;
   a current source for supplying the processor with substantially constant operating current at a level switchable among multiple nonzero current levels, and adapted to switch the level of the output operating current independently of an instantaneous power demand of the processor by switching, on at least one of a periodic and an aperiodic basis, among the multiple nonzero current levels.

2. The device of claim 1 wherein the charge storage device comprises a capacitor in series with the current source, and across which the processor is connected in parallel.

3. The device of claim 1 wherein the current source is adapted to switch between two different nonzero current levels.

4. The device of claim 3 wherein the current source is adapted to determine the interval between switching current levels based on an average power demand of the processor.

5. The device of claim 1 wherein the current source further comprises:
   a second current source adapted to provide a noise current, superposed on the substantially constant current, that varies on at least one from among a random and pseudo-random basis.

6. The device of claim 1 further including a control means for controlling the current source to maintain the supply voltage to the processor between an upper voltage limit and a lower voltage limit.

7. The device of claim 1 further including a zener diode connected to the processor to maintain the supply voltage to the processor between an upper voltage limit and a lower voltage limit.

8. The device of claim 6 wherein the control means includes a current switching means for switching the current source between a first, higher current level and a second, lower current level, the current level switching being triggered by the supply voltage to the processor respectively reaching the lower voltage limit and the upper voltage limit.

9. The device of claim 8 further including a timer for determining a time period taken for the processor supply voltage to reach a lower voltage limit from an upper voltage limit, or vice versa.

10. The device of claim 9 wherein the timer determines whether the time period falls outside predetermined limits, and further including current setting means for varying at least one from among the first current level and the second current level of the current source if the timer determines that the time period falls outside the predetermined limits.

11. The device of claim 10 wherein the predetermined limits include a first predetermined threshold, and wherein the current setting means raises the first current level if the timer determines that the time period for reaching the lower voltage limit falls below the first predetermined threshold.

12. The device of claim 10 wherein the predetermined limits include a second predetermined threshold, and wherein the current setting means reduces the first current level if the timer determines that the time period for reaching the lower voltage limit exceeds the second predetermined level.

13. The device of claim 10 wherein the predetermined limits include a first predetermined threshold, and wherein the current setting means reduces the second current level if the timer determines that the time period for reaching the upper voltage limit exceeds the first predetermined level.

14. The device of claim 10 wherein the predetermined limits include a second predetermined threshold, and wherein the current setting means raises the second current level if the timer determines that the time period for reaching the upper voltage limit exceeds the second predetermined level.

15. The device of claim 8 wherein the control means includes means for temporarily inhibiting the current switching means if the supply voltage to the processor fails to move towards the upper voltage limit or the lower voltage limit.

16. The device of claim 1 wherein the processor has an internal clock having a frequency that is dependent upon the supply voltage to the processor.

17. The device of claim 1 wherein the processor is a cryptographic processor.

18. The device of claim 1 further comprising a smart card supporting the processor, the charge storage device, and the current source.

19. A method of operating a data processing device having a processor and a charge storage device connected to the processor, comprising:
   drawing a substantially constant current from an external power supply at a level switchable among multiple nonzero levels; and
   cyclically apportioning the substantially constant current flow from the current source between a charge storage device and the processor,
   wherein the step of cyclically apportioning the substantially constant current flow switches the drawn current level between the multiple different nonzero substantially constant current levels at one from among a periodic and aperiodic basis, the switching being such that the drawn current varies independently of the instantaneous power demand of the processor.

20. The method of claim 19 wherein the step of cyclically apportioning a current flow to the processor and the charge storage device switches the level of the drawn current, periodically or aperiodically, between two different nonzero substantially constant current levels.

21. The method of claim 20 wherein the step of cyclically apportioning a current flow includes determining the interval between switching according to an average power demand of the processor.

22. The method of claim 19 wherein the step of cyclically apportioning a substantially constant current flow utilizes a first current source, and further including:
   utilizing a second current source to provide a superposed current that varies on a random or pseudorandom basis and
   delivering the combined current of the first and second current sources to the processor and the charge storage device.

23. The method of any one of the claims 19, 20, 21, and 22 further including the step of maintaining a supply voltage to the processor between an upper voltage limit and a lower voltage limit.

24. The method of claim 23 wherein the step of cyclically apportioning a substantially constant current flow switches the current level between a first, higher current level and a second, lower, current level, when the supply voltage to the processor respectively reaches the lower voltage limit and the higher voltage limit.

25. The method of claim 24 wherein the step of cyclically apportioning a substantially constant current flow further includes the steps of:
   determining a time period taken for the processor supply voltage to reach a lower voltage limit from an upper voltage limit, or vice versa, and
   varying the first current level and/or the second current level of the current if the time period falls outside predetermined limits.

26. The method of claim 25 wherein said step of varying further includes raising the first current level if the time period for reaching the lower voltage limit falls below a first predetermined threshold.

27. The method of claim 25 wherein said step of varying further includes reducing the first current level if the time period for reaching the lower voltage limit exceeds a second predetermined threshold.

28. The method of claim 25 wherein said step of varying further includes reducing the second current level of the time period for reaching the upper voltage limit falls below a first predetermined threshold.

29. The method of claim 25 wherein said step of varying further includes raising the second current level if the time period for reaching the upper voltage limit exceeds a second predetermined threshold.

30. The method of claim 24 further including the step of temporarily inhibiting the current switching if the supply voltage to the processor fails to move towards the upper voltage limit or the lower voltage limit.

31. The method of claim 19 further including the step of controlling the frequency of operation of the processor as a function of the supply voltage to the processor.

32. The method of claim 26 wherein said step of varying further includes reducing the first current level if the time period for reaching the lower voltage limit exceeds a second predetermined threshold.

* * * * *